(12) United States Patent
Kuhlman et al.

(10) Patent No.: US 11,704,759 B2
(45) Date of Patent: Jul. 18, 2023

(54) APPARATUSES, SYSTEMS, AND METHODS FOR OBTAINING AND RECORDING CONSENT FOR A PROPOSED OBJECT OF CONSENT FOR A DIGITAL AGREEMENT USING A BLOCKCHAIN

(71) Applicant: Monax Industries Limited, London (GB)

(72) Inventors: Casey Kuhlman, Edinburgh (GB); Jan Hendrik Scheufen, Chappaqua, NY (US); Anjlee Khurana, Nashville, TN (US)

(*) Notice: Subject to any disclaimer, the term of this patent is extended or adjusted under 35 U.S.C. 154(b) by 526 days.

(21) Appl. No.: 16/698,330

(22) Filed: Nov. 27, 2019

(65) Prior Publication Data

US 2021/0158462 A1 May 27, 2021

(51) Int. Cl.
*G06Q 50/18* (2012.01)
*G06F 16/23* (2019.01)

(52) U.S. Cl.
CPC ......... *G06Q 50/18* (2013.01); *G06F 16/2365* (2019.01); *G06F 16/2379* (2019.01); *G06Q 2220/00* (2013.01)

(58) Field of Classification Search
CPC ...................................................... G06Q 50/18
See application file for complete search history.

(56) References Cited

U.S. PATENT DOCUMENTS

2015/0269692 A1* 9/2015 Ryan ..................... G06Q 10/00
  705/311
2020/0007581 A1* 1/2020 Vouk ..................... H04L 9/3239
2020/0012767 A1* 1/2020 Votaw ................. G06Q 20/4016
2020/0034919 A1* 1/2020 Qiu ..................... G06Q 30/0645
2021/0083872 A1* 3/2021 Desmarais ............ H04L 9/3239

OTHER PUBLICATIONS

"Agreements Network: The Legal Layer for a Networked World," [online], published on Apr. 25, 2018, available at: < https://web.archive.org/web/20200426170631/https://agreements.network/files/an_whitepaper_v1.0.pdf > (Year: 2018).*
Davidson, Rachel, "Introducing the Monax BPMN Engine—the Powerhouse for Legal Products," [online] published on Sep. 25, 2018, available at: < https://web.archive.org/web/20190308055855/https://monax.io/blog/2018/09/25/introducing-the-monax-bpmn-engine—the-powerhouse-for-legal-products./ > (Year: 2018).*

* cited by examiner

*Primary Examiner* — Richard W. Crandall
(74) *Attorney, Agent, or Firm* — Patterson Intellectual Property Law, P.C.; Ryan D. Levy

(57) ABSTRACT

Apparatuses, systems, and methods are described for selectively performing one or more operations relating to an object of consent. The system includes (i) a network, (ii) a user device having an input device and configured to obtain an object of consent from a user of the user device via the input device, (iii) a server having a storage and configured to receive the object of consent from the user device, to perform at least one data processing operation associated with the object of consent, to store a result of the data processing operation at the storage, and to generate an agreement object associated with the object of consent, and (iv) a blockchain configured to receive the agreement object, to combine at least one of identity information or permission information associated with the agreement object, and to selectively store a consent record by the blockchain.

7 Claims, 13 Drawing Sheets

APPARATUSES, SYSTEMS, AND METHODS FOR OBTAINING AND RECORDING CONSENT FOR A PROPOSED OBJECT OF CONSENT FOR A DIGITAL AGREEMENT USING A BLOCKCHAIN

A portion of the disclosure of this patent document contains material that is subject to copyright. The copyright owner has no objection to the authorized facsimile reproduction by anyone of the patent document or the patent disclosure, as it appears in the Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

Obtaining and verifying consent from a party to one or more terms of an agreement can often be difficult. Informal agreements, such as verbal agreements or informal deals, are often agreed upon without having any writings or evidence of consent or agreement. Informal agreement may often be used in fields and locations where formal agreements are not typically used, such as in emerging markets. Problems thus exist where informal agreements are not memorialized and there is no evidence of an agreement or terms thereof. Furthermore, uncertainty regarding contract law and the requirements of formation, language barriers, lack of access to legal counsel, and other hurdles can make agreement formation difficult or impossible.

Additional problems relate to one or more parties hesitant to formalize an agreement or aspects of an agreement, rendering consent as to the agreement or subset thereof indefinite and unprovable. This is especially true in cases of creative industries and other sectors where traditional agreement formation in the field does not require or request a formal agreement document. Existing technologies may allow users to log into an account and digitally sign a document. However, such systems are unable to prove an identity of a user signing an agreement, and the contents of a signed agreement.

Existing systems have numerous deficiencies. For example, agreements may be lost, versioning differences may cause issues, and proof of consent might not be documentary, reliable, or easily obtainable or verifiable. This is especially true in the context of digital agreements where proof of a party's consent to one or more terms may be difficult to implement. For example, overly burdensome digital signing technologies may prevent a proper recordation of approval, user identity may be difficult or impossible to obtain, and party approval may be limited to an entire agreement rather than portion thereof or particular object of consent. Previous systems have failed to provide solutions using biometric data as an act of consent regarding an agreement or agreement term. Still further problems with existing systems relate to lacking a clearly identified and displayed object of consent.

BRIEF SUMMARY

Recognized herein is a need for apparatuses, systems, and methods that address at least aspects of the abovementioned problems as well as additional problems. Disclosed herein are apparatuses, systems, and methods for creating and implementing consent for an agreement.

Providing, receiving, and memorializing consent to an agreement is performed according to various aspects of the present disclosure. As used herein, the term consent may refer to signing or otherwise providing recordable indicia in relation to an agreement. The scope of agreement may vary by implementation and scope of intended consent.

According to one aspect, provided is a system for recording consent to a digital agreement associated with an object of consent. The system includes (i) a network, (ii) a user device coupleable to the network, the user device having an input device and configured to obtain an object of consent from a user of the user device via the input device, (iii) a server coupleable to the network, the server having a storage and configured to receive the object of consent from the user device, to perform at least one data processing operation associated with the object of consent, to store a result of the data processing operation at the storage, and to generate an agreement object associated with the object of consent, and (iv) a blockchain having one or more computing devices coupleable to the network, the blockchain configured to receive the agreement object, to combine at least one of identity information or permission information associated with the agreement object, and to selectively store a consent record by the blockchain.

According to another aspect of the present disclosure, provided is a method of proposing an object of consent. The method includes obtaining a proposed object of consent at a user device, using a template object, creating an agreement object based at least in part upon the object of consent obtained from the user device, storing a representation of the agreement object, determining at least one of an identity parameter or permission parameter associated with the agreement object, combining a representation of the agreement object with the at least one of the identity parameter or the permission parameter, and storing the combined representation within a blockchain.

Another aspect of the present disclosure relates to providing a method of obtaining consent in relation to a proposed object of consent. The method includes receiving a notification of the proposed object of consent at a user device, reviewing the proposed object of consent, selectively providing an act of consent in relation to the proposed object of consent using an input device of the user device, wherein the selectively provided act of consent includes providing at least one set of data associated with a user of the user device, associating the at least one set of data with a set of contextual data associated with at least one of the user device or a user of the user device, creating a signature object associated with the proposed object of consent based at least in part upon the at least one set of data and the set of contextual data, and storing a representation of the signature object within a blockchain.

A further aspect of the present disclosure relates to providing a method of modifying state based upon a proposed object of consent. The method includes receiving transaction data by a template object, wherein the transaction data comprises an object of consent, creating a unique agreement object based at least in part upon the received transaction data, wherein the unique agreement object has a first state, loading an agreement object process model into a process engine within a blockchain, adjusting a state of the unique agreement object from the first state to a second state, determining one or more signing tasks associated with the unique agreement object, wherein a signing task of the one or more signing tasks is associated with a signature object, selectively registering with the blockchain the signature object, wherein the signature object is associated with an act of consent as to the object of consent by a signing user, and transitioning the agreement object from the second state to a third state when it is determined that all required signature objects for the unique agreement object have been satisfied.

Numerous other objects, features, and advantages of the present disclosure will be readily apparent to those skilled in the art upon a reading of the following disclosure when taken in conjunction with the accompanying drawings.

DETAILED DESCRIPTION

Figure 1:
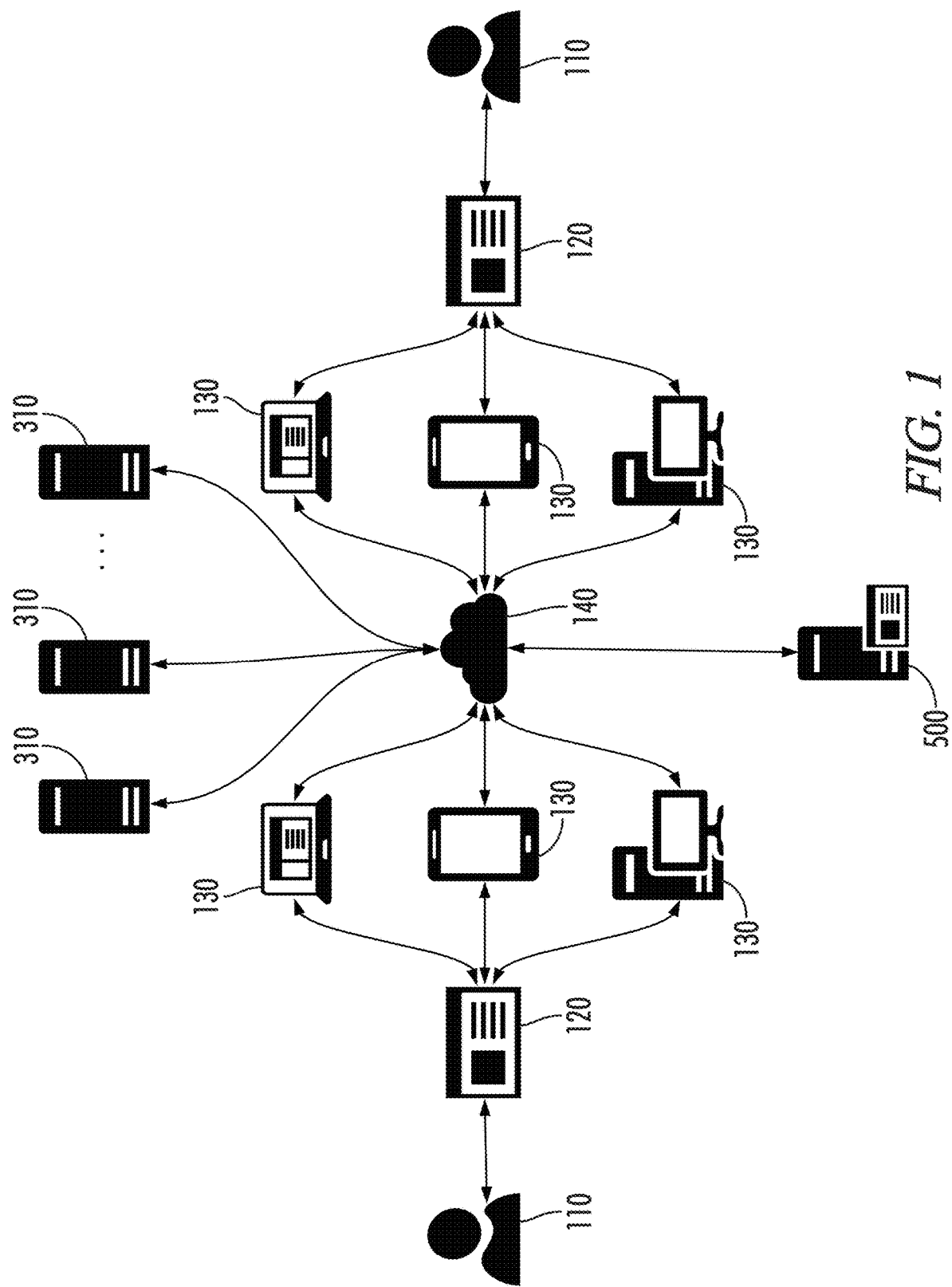
FIG. 1 illustrates an exemplary embodiment of a network diagram of a system for providing creation and verification relating to an object of consent according to aspects of the present disclosure.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not delimit the scope of the disclosure.

Referring generally to FIGS. 1-13, various exemplary apparatuses and associated methods according to the present disclosure are now described in detail. Where the various figures may describe embodiments sharing various common elements and features with other embodiments, similar elements and features are given the same reference numerals and redundant description thereof may be omitted below.

FIG. 1 illustrates an exemplary embodiment of a network diagram of a system for providing creation and verification relating to an object of consent according to aspects of the present disclosure. The system 100 includes a first user 110 interacting with an application 120 executing on a user device 130. As discussed below with reference to FIG. 2, the application 120 may include a client app 212 or may be accessible by a browser 214 executing upon the user device 130. The client app 212 may be a standalone app in one or more embodiments. As used herein, descriptions of at least one action performed by the client app 212 and/or browser 214 may variously be referred to as being performed by the user device 130. In such descriptions, the user device 130 is capable of performing one or more operations relating to the client app 212 and/or browser 214 by executing one or more sets of instructions to perform the described action or operation.

The user device 130 associated with the first user 110 is communicatively coupleable to a network 140. In one exemplary embodiment, the network 140 includes the Internet, a public network, a private network, or any other communications network capable of conveying electronic communications. Connection between the communications module 230 of the user device 130 and the network 140 is configured to be performed by wired interface, wireless interface, or a combination thereof. A plurality of computing devices 310 are communicatively coupled to the network 140. A second user 150 is likewise capable of interacting with the application 120 in the same manner as the first user 110. The second user 150 may interact with an instance of the application 120 executing upon a user device 130. The user device 130 associated with the second user 150 is communicatively coupleable with the network 140 by wired interface, wireless interface, or a combination thereof. A server 500 may be communicatively coupleable with the network 140 by wired interface, wireless interface, or a combination thereof.

Figure 2:
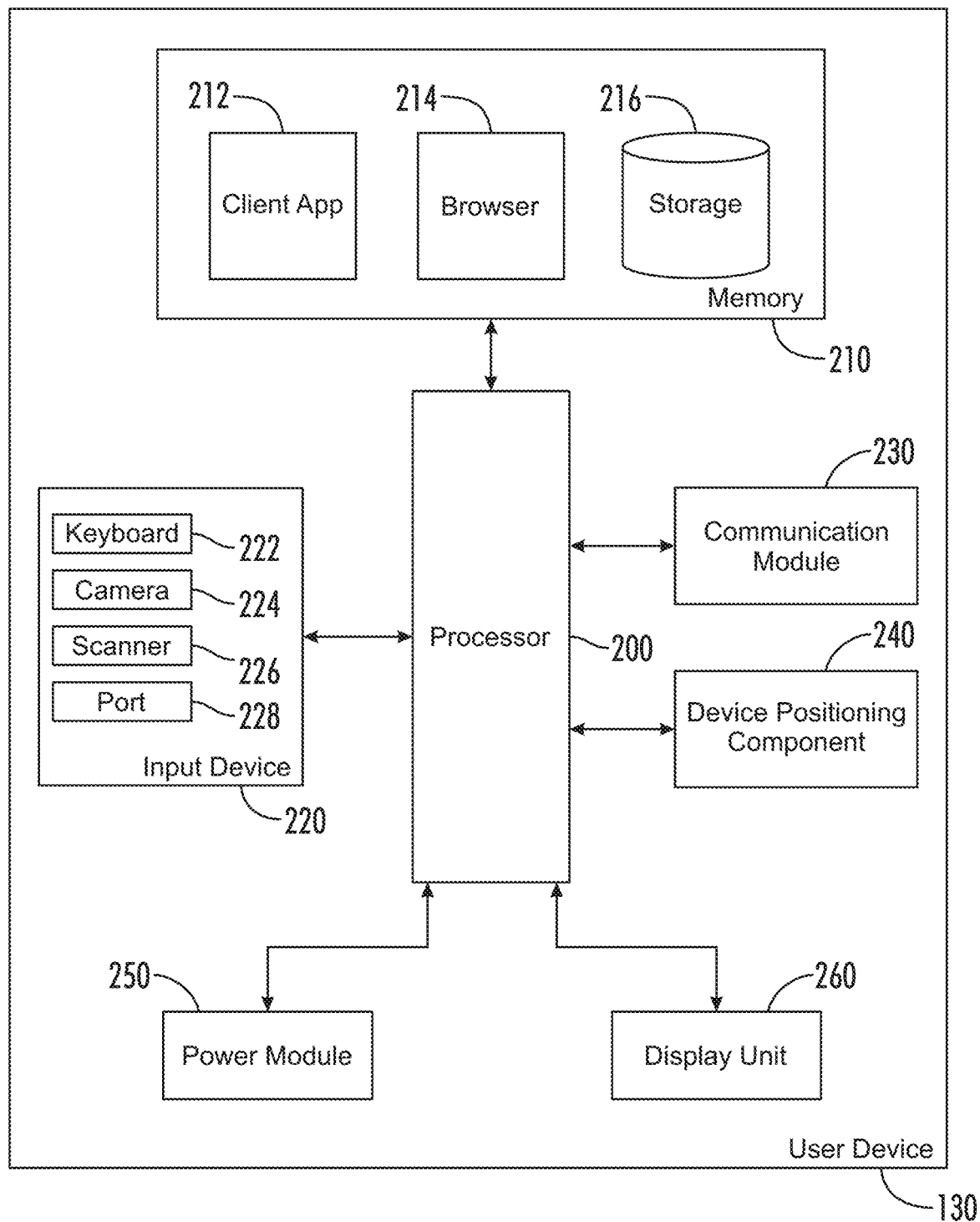
FIG. 2 illustrates a block diagram of an exemplary embodiment of a user device according to aspects of the present disclosure.

FIG. 2 illustrates a block diagram of an exemplary embodiment of a user device 130 according to aspects of the present disclosure. A user device 130 may be used by one or more users of the system 100 and may include a processor 200 coupled to one or more elements via a communication bus. In various exemplary embodiments, the user device 130 is implemented as at least one of a desktop computer, a laptop computer, a tablet computing device, a mobile electronic device, a smart phone, or any other electronic device capable of executing instructions. The processor 200 may be a generic hardware processor, a special-purpose hardware processor, or a combination thereof. In embodiments having a generic hardware processor (e.g., as a central processing unit (CPU) available from manufacturers such as Intel® and AMD®), the generic hardware processor is configured to be converted to a special-purpose processor, such as by being programmed to execute and/or by executing a particular algorithm in the manner discussed herein for providing a specific operation or result.

The user device 130 includes a memory 210 connected to the processor 200. The memory 210 may include, in whole or in part, any form of volatile or non-volatile memory, such as a random-access memory (RAM), read-only memory (ROM), or any other element capable of temporarily or permanently storing information. Although illustrated as being embodied as part of the user device 130, it should be appreciated that one or more components of the memory 210 may be physically or virtually located at the user device 130, either in whole or in part.

The memory 210 may include a client app 212. The client app 212 is configured to perform one or more operations associated with the application 120 as described above with reference to FIG. 1. Additionally or alternatively, a browser 214 may be stored at the memory 210 and configured to perform at least one action associated with the application 120. The browser 214 may be an internet browser, a plug-in associated with an internet browser, or any other interface capable of conveying information received at the user device 130. Each of the client app 212 and the browser 214 may be configured to visually convey information to a user via a display unit 260. The memory 210 may include a storage 216 configured to store at least one set of information used by or associated with the client app 212.

The user device 130 includes one or more input device 220 configured to provide input to the user device 130. At least one input device 220 may be a sensor configured to obtain a sensor value corresponding to a user of the user device 130. The input provided to the user device 130 may be input from a user of the user device 130. The user device 130 is configured to receive information from one or more input device 220 and to perform one or more actions corresponding to the client app 212 and/or browser 214 using the processor 200. The one or more input devices 220 may be physically or logically part of the user device 130, either in whole or in part. For example, a keyboard 222 may be physically part of the user device 130, and/or may be coupleable to the user device 130, for example via at least one port 228. The user device 130 may include or otherwise be communicatively coupleable with a camera 224. The client app 212 and/or browser 214 may be configured to receive an image or video from the camera 224. The camera 224 may optionally include a microphone or other audiovisual input device capable of capturing audiovisual data for use by or in conjunction with the client app 212 and/or browser 214. The user device 130 may also include at least one scanner 226. The scanner 226 may be configured to obtain at least one biometric reading from a user of the user device 130. Biometric readings capable of being obtained by a scanner 226 include but are not limited to a fingerprint, a retina scan, a hand geometry, a face scan, a heart rate monitor, or any other form of biometric information capable of being obtained. The scanner 226 may be a sensor configured to obtain at least one biometric reading for use by the client app 212 and/or browser 214. At least one input device 220 may be physically or virtually part of the user device 130 and/or may be physically or virtually separate from the user device 130 but communicatively coupleable with the user device 130 to perform one or more actions described herein. The user device 130 via the client app 212 and/or browser 214 may be configured to dynamically determine a set of multimodal biometric data required from a first user 110 or second user 150 to confirm their respective identity. For example, the user device 130 may be configured to dynamically determine two or more biometric data types or sets of content for a first user 110 or second user 150, optionally based in part upon at least one input device 220 coupled thereto and/or a parameter associated with an object of consent. In one embodiment the user device 130 is configured to select two or more biometric data type requirements from a group including facial recognition (either with or without liveness detection), retina recognition, fingerprint recognition, audio or voice recognition, or any other type of biometric data capable of being obtained by the user device 130. The client app 212 and/or browser 214 of the user device 130 may be configured to provide multiple levels of user identity assurance. For example, a base level assurance may be used to assemble and/or store evidence around a user's consent but not perform a biometric confirmation process on the evidence. An advanced level of assurance may be provided by comparing captured user biometric data against pre-stored biometric data for a particular user, against state-issued or other known identification information accessible by at least one of the client app 212 and/or browser 214 (e.g., in a situation where the user has yet to provide at least one set of biometric information via the client app 212 and/or browser 214. The pre-stored biometric data may then be used to confirm or deny an identity a user of the user device 130 for a particular object of consent.

The user device 130 may include a power module 250 configured to power the user device 130. The power module 250 may be a battery such as a lithium-ion battery in various embodiments. The power module 250 may be configured to receive input power from an external source. In such embodiment, the power module 250 may be configured to store at least a portion of input power received from the external source, for example at a battery of the power module 250.

The display unit 260 may include a liquid crystal display (LCD), an organic light emitting device (OLED) display, a plasma display, a projection display, a light emitting diode (LED) display, a cathode ray tube (CRT) display, or any other device capable of visually conveying information from the client app 212 to a user. The display unit 260 may be physically embodied as part of the user device 130 in one embodiment. In various embodiments, the display unit may be physically separate from the user device 130. The display unit 260 is configured to be communicatively coupled to the user device 130 via at least one wired or wireless connection to the processor 200. The display unit 260 may be configured to operate, at least in part, based upon one or more operations of the client app 212, as executed by the processor 200.

The user device 130 includes a communication module 230 configured to communicate with at least one other device via a wired interface, wireless interface, or a combination thereof. In various embodiments, the user device 130 is configured to operate using information received from a remote source received via the communication module 230, and is configured to obtain or otherwise operate upon one or more instructions stored physically remote from the user device 130 (e.g., via client-server communications, cloud-based computing, peer-to-peer configuration, or other communication method or protocol).

The user device 130 may include a device positioning component 240. The device positioning component 240 is configured to obtain or otherwise be used to determine a physical position, orientation, location, or other spatial data associated with the user device 130. In one embodiment the device positioning component 240 includes a global positioning system (GPS) component configured to obtain a geolocation of the user device 130.

Figure 3:
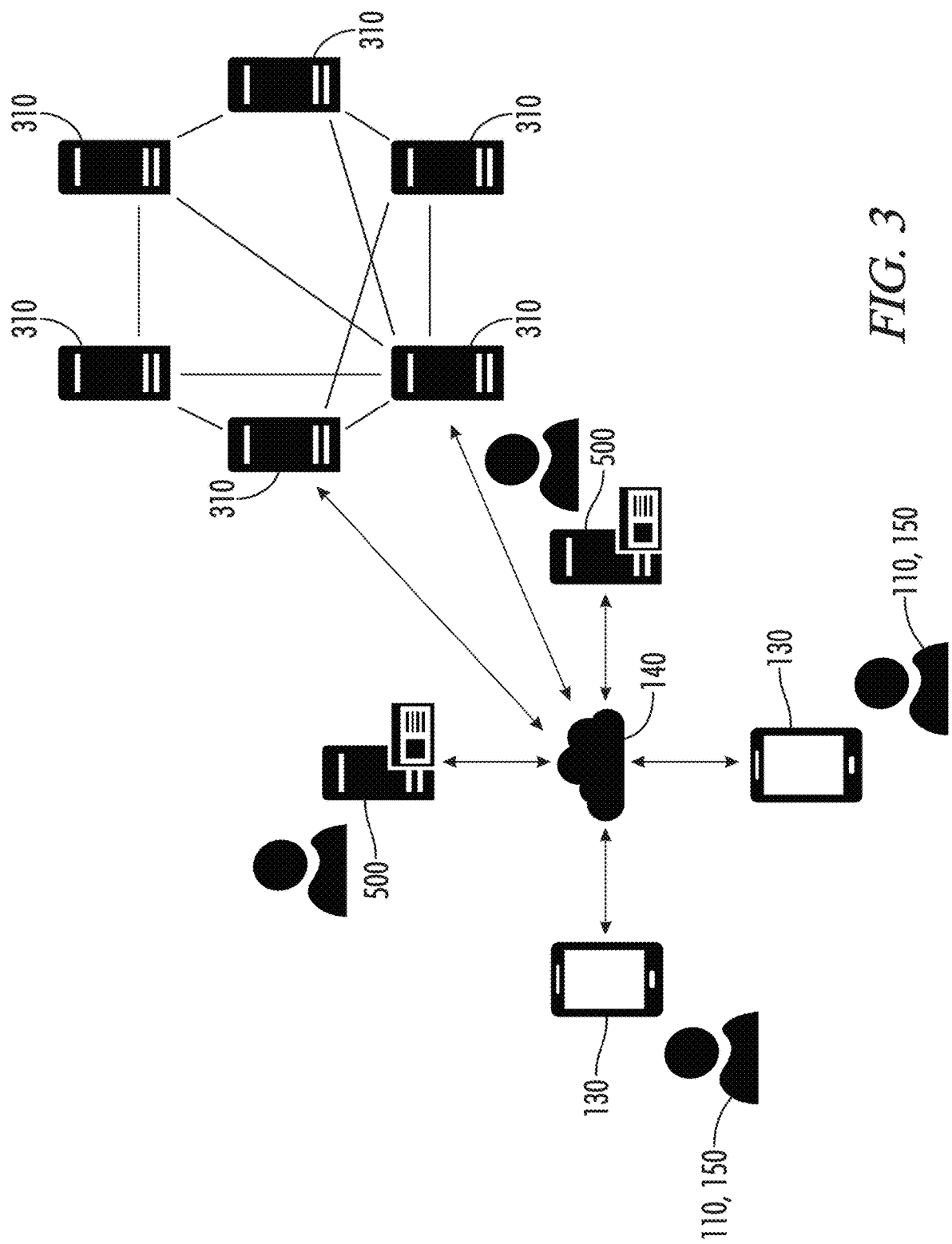
FIG. 3 illustrates a partial network diagram of an exemplary embodiment of a blockchain system according to aspects of the present disclosure.

FIG. 3 illustrates a partial network of an exemplary embodiment of a blockchain system according to aspects of the present disclosure. The blockchain system 300 includes at least one user (e.g., user 110, 150) associated with a user device 130 coupleable to a network 140. At least one service provider (e.g., server 500 as described herein) may be communicatively coupleable to the network 140 and be configured to provide at least one service, for example an Application Programming Interface (API).

The blockchain system 300 further includes a plurality of computing devices 310 coupleable to a network 140 and/or at least one other of the plurality of computing device, for example in a peer-to-peer configuration, a ring, or any other physical or logical arrangement of computing devices 310. Each computing device 310 of the plurality of computing devices 310 associated with a particular set of information may include at least a portion of a data block 320 (referring to FIG. 4) stored at or otherwise accessible via the computing device 310 (e.g., as a set of information and/or metadata such as a cryptographic hash). Additionally or alternatively, at least a portion of a data block 320 may be stored remotely from a computing device 310 but is capable of being accessed and controlled by the computing device 310. The data block 320 may include at least one data block or set of metadata associated with the at least one data block 320 shared between a plurality of computing devices 310. The computing devices 310 are configured to perform at least one operation on or in conjunction with data corresponding to the at least one data block 320 shared between the plurality of computing devices 310. For example, two computing devices 310 may be configured to perform a verification operation relating to a transaction associated with a data block 320 shared between the two computing devices 310, either alone or in combination.

Figure 4:
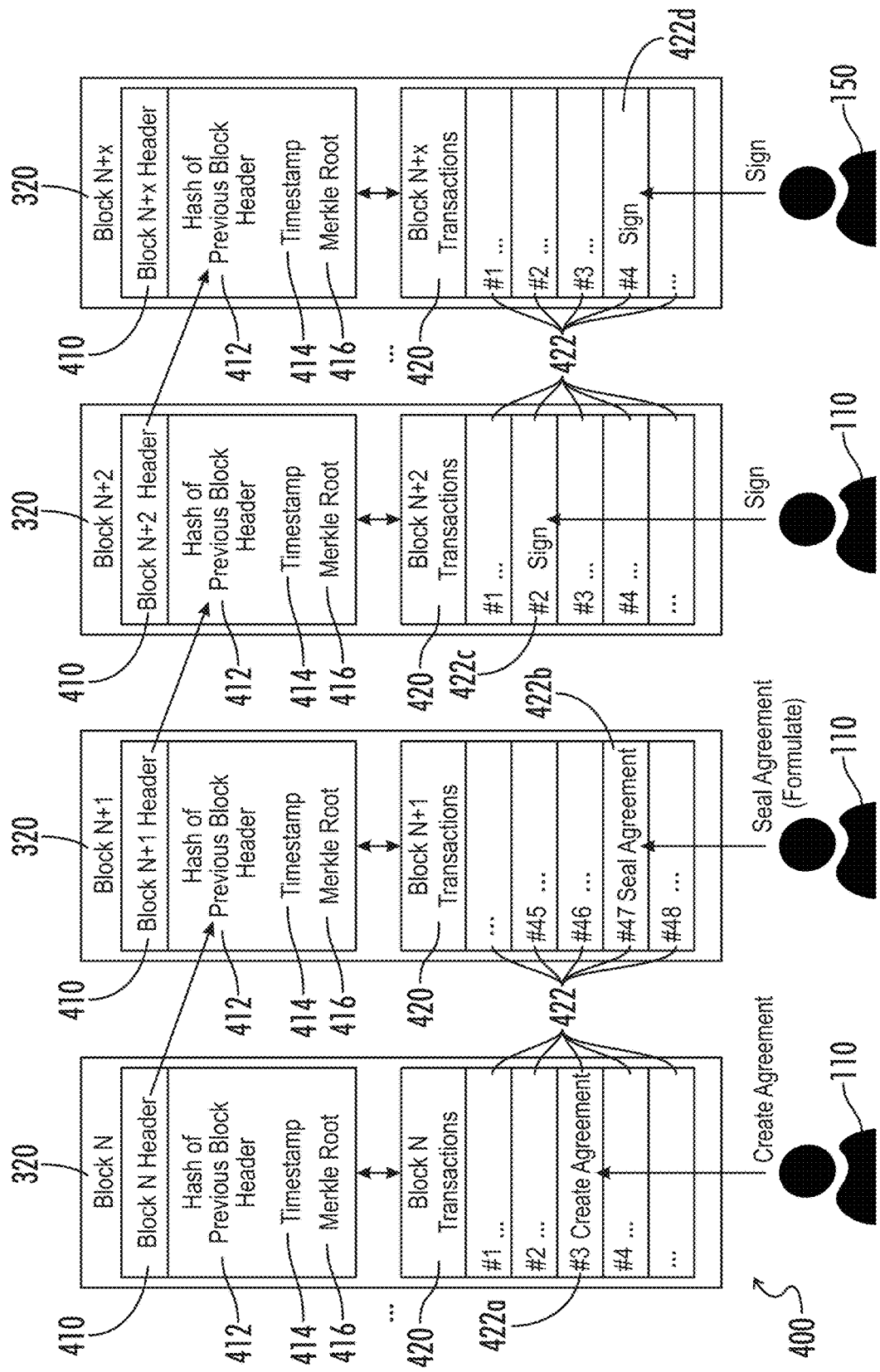
FIG. 4 illustrates a diagram of information included within a blockchain according to aspects of the present disclosure.

FIG. 4 illustrates a diagram of an exemplary embodiment illustrating information included within a data block of a blockchain system according to aspects of the present disclosure. A data block 320 (e.g., Block N, Block N+1, Block N+2, Block N+x, etc.) may include a block header 410. The block header 410 may include one or more sets of data and/or metadata in various embodiments. In the embodiment illustrated by FIG. 4 the block headers 410 of the data blocks 320 include a hash of a previous block header 412, a timestamp 414, and a Merkle root 416, although a data block 320 in accordance with various embodiments may include more or fewer sets of data and/or metadata without departing from the spirit and scope of the present disclosure. Each data block 320 may be linked to a previous data block 320 using the hash of the previous block header 412 stored at the block header 410 of a data block 320. A plurality of data blocks 320 may be linked together in this fashion to create a blockchain.

A data block 320 may include a transaction list 420. The transaction list 420 may include one or more transactions 422. Data and/or metadata includable in the transaction list 420 may include an agreement object or information associated with an object of consent and/or agreement object relating to an object of consent. At least one of identity information and/or permission information may be included within and/or combinable with an agreement object. Transaction data or representation thereof stored at the transaction list 420 may be provided by or otherwise associated with at least one user 110, 150.

For example, at Data Block N of FIG. 4, the third transaction 422a of the transaction list 420 may relate to an agreement creation operation of the first user 110. The forty seventh transaction 422b of the transaction list 420 of Data Block N+1 may relate to sealing agreement by the second user 150. A second transaction 422c of the transaction list 420 of the Data Block N+2 may relate to agreement signing information associated with or received from the first user 110. Similarly, the fourth information 422d of transaction list 420 may relate to agreement signing information associated with or received from the second user 150. As understood by one having ordinary skill in the art, the particular transaction numbers described above and illustrated by FIG. 4 are merely exemplary and may vary based upon implementation. Furthermore, although illustrated as being contained in sequential data blocks, it should be appreciated that transaction information associated with an agreement or object of consent may be included within transaction list 420 at one or more data blocks 320 not ordered sequentially.

Figure 5:
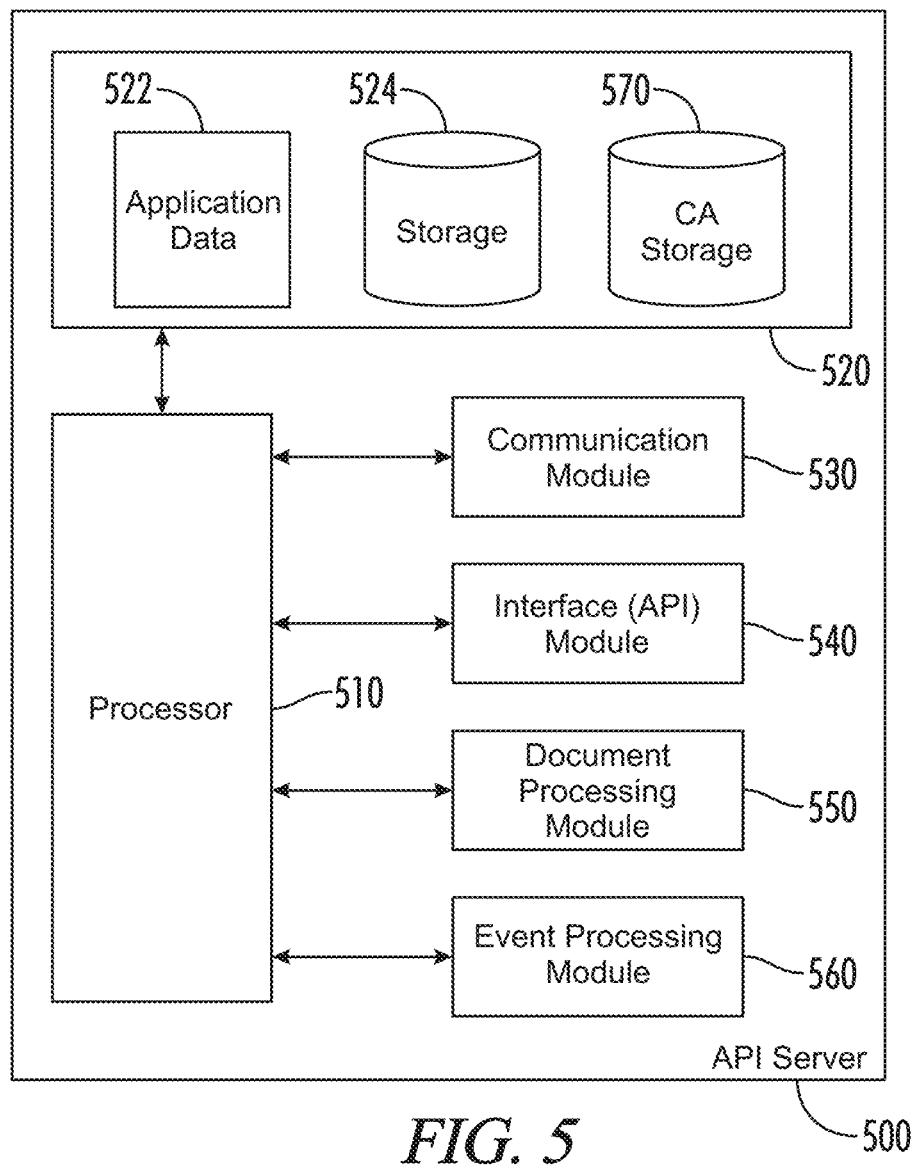
FIG. 5 illustrates a block diagram of an exemplary embodiment of a server according to aspects of the present disclosure.

FIG. 5 illustrates a block diagram of an exemplary embodiment of a server 500 according to aspects of the present disclosure. The server 500 may be an application programming interface (API) server or interface in various embodiments. The server 500 includes a processor 510 coupled to one or more elements via a communication bus. In various exemplary embodiments, the server 500 is a server computer or any other electronic device capable of executing instructions. The processor 510 may be a generic hardware processor, a special-purpose hardware processor, or a combination thereof. In embodiments having a generic hardware processor (e.g., as a central processing unit (CPU) available from manufacturers such as Intel® and AMD®), the generic hardware processor is configured to be converted to a special-purpose processor, such as by being programmed to execute and/or by executing a particular algorithm in the manner discussed herein for providing a specific operation or result.

The server 500 includes a memory 520 connected to the processor 510. The memory 520 may include, in whole or in part, any form of volatile or non-volatile memory, such as a random-access memory (RAM), read-only memory (ROM), or any other element capable of temporarily or permanently storing information. Although illustrated as being embodied as part of the server 500, it should be appreciated that one or more components of the memory 520 may be physically or virtually located at the server 500, either in whole or in part. The memory 520 may include an application data section 522, a storage 524, and/or a content-addressable file storage system 570.

The server 500 optionally includes one or more of an interface (API) module 540, a document processing module 550, and/or an events processing module 560. The interface module 540 is communicatively coupleable to the network 140, for example via the communication module 530. The interface module 540 may be configured to receive a communication relating to at least one corresponding API operation or event and to coordinate execution or operation of such at the server 500. In various exemplary embodiments, the interface module 540 is configured to perform at least one operation on or in association with at least one file or section of the content-addressable file storage system 570 and/or storage 524. In one or more embodiments, the interface module 540 is configured to coordinate one or more communications and/or operations between the server 500 and at least one computing device 310. For example, the interface module 540 may optionally permit one or more blockchain operations to be performed via the at least one computing device 310 (e.g., using one or more blockchain scripts of the blockchain 1010 as described herein).

The document processing module 550 is configured to control one or more document processing operations between the interface module 540 and the content-addressable file storage system 570. For example, the document processing module 550 may coordinate document processing, accessing to one or more documents within the content-addressable file storage system 570, or any other document processing operation within the scope of the present disclosure. The content-addressable storage system 570 may selectively communicate with the interface module 540, for example to provide one or more file operations such as read or write, or to obtain a content address. The events processing module 560 is communicatively coupleable to the interface module 540 and one or more blockchain nodes 1012 (as described below with reference to FIG. 10). The events processing module 560 is configured to coordinate one or more blockchain operations directly via communication with one or more blockchain nodes 1012.

Figure 6:
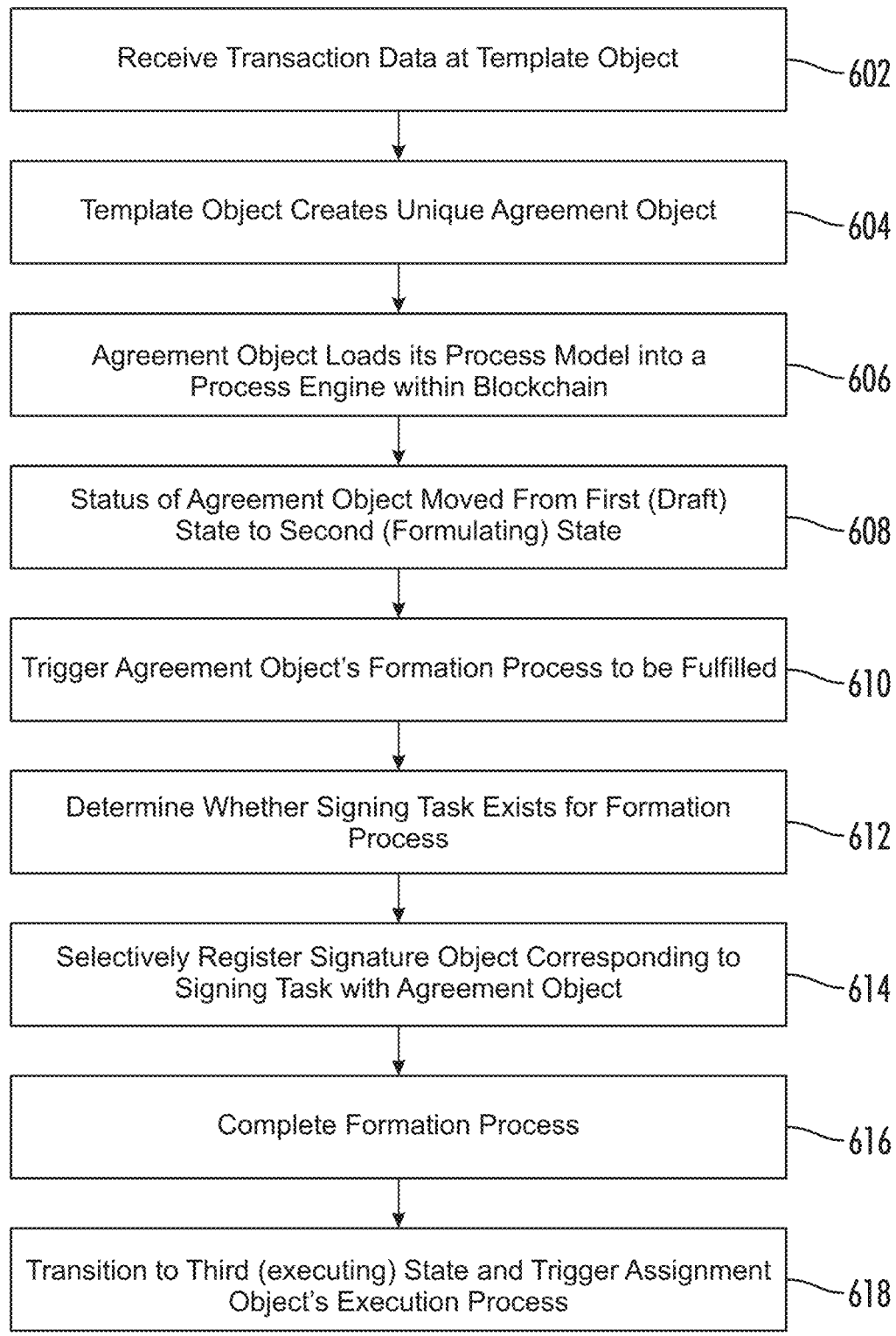
FIG. 6 illustrates an exemplary embodiment of a contract process according to aspects of the present disclosure.

FIG. 6 illustrates an exemplary embodiment of a digital contract process 600 according to aspects of the present disclosure. The contract process 600 begins at an operation 602 where a template object receives transaction data. The template object may be a data object. The template object may be a data object stored on content addressable storage system 570. The template object may include any number of aspects regarding the relationship between pieces of obtainable transactional data. The transactional data may include one or more parameters, such as the existence of and identity of actors that may be party to or referenced in an agreement. The one or more parameters may optionally be used to create a new digital agreement in various embodiments.

The process then continues to an operation 604 where the template object creates a unique agreement object based on the received transaction data and including instantiation parameters associated with the transaction data. An agreement object then loads its process model into a process engine within a blockchain at an operation 606. A status of the agreement object is then moved from a 'draft' state to a 'formulating' state upon loading the process engine at an operation 608. An agreement object generated from the template object may have a plurality of states, such as a 'draft' state, a 'formulating' state, or any other state. Each such state and state change may or may not be controlled by a process model, as determined by the parties at the time of agreement. In some instances, the state of the agreement object may be updated prior to, with, or subsequent to different operations of the digital contract process 600. The process engine then triggers the agreement's formulation process to be fulfilled at an operation 610. It is determined at an operation 612 whether the formation process contains at least one signing task. Regardless of whether the formation process contains at least one signing task, the process engine may permit other, non-signing tasks to be performed. If it is determined at operation 612 that no signing task is associated with the formation process, optionally no signature object is registered for the agreement. If it is determined that at least one signing task is contained in the formation process, at least one signature object corresponding to the signing task is registered in association with the agreement at an operation 614. A signature object may be a data object created on device 130 using application 120. A signature object may comprise one or more sets of information including or corresponding to demonstrated consent captured in one of various media as discussed throughout this application. Once all required signature objects are associated with the agreement, the formation process may complete at an operation 616. The agreement object may then be moved from a 'formulation' state to an 'executing' state and the process engine may trigger the agreement's execution process to be fulfilled at an operation 618.

Figure 7:
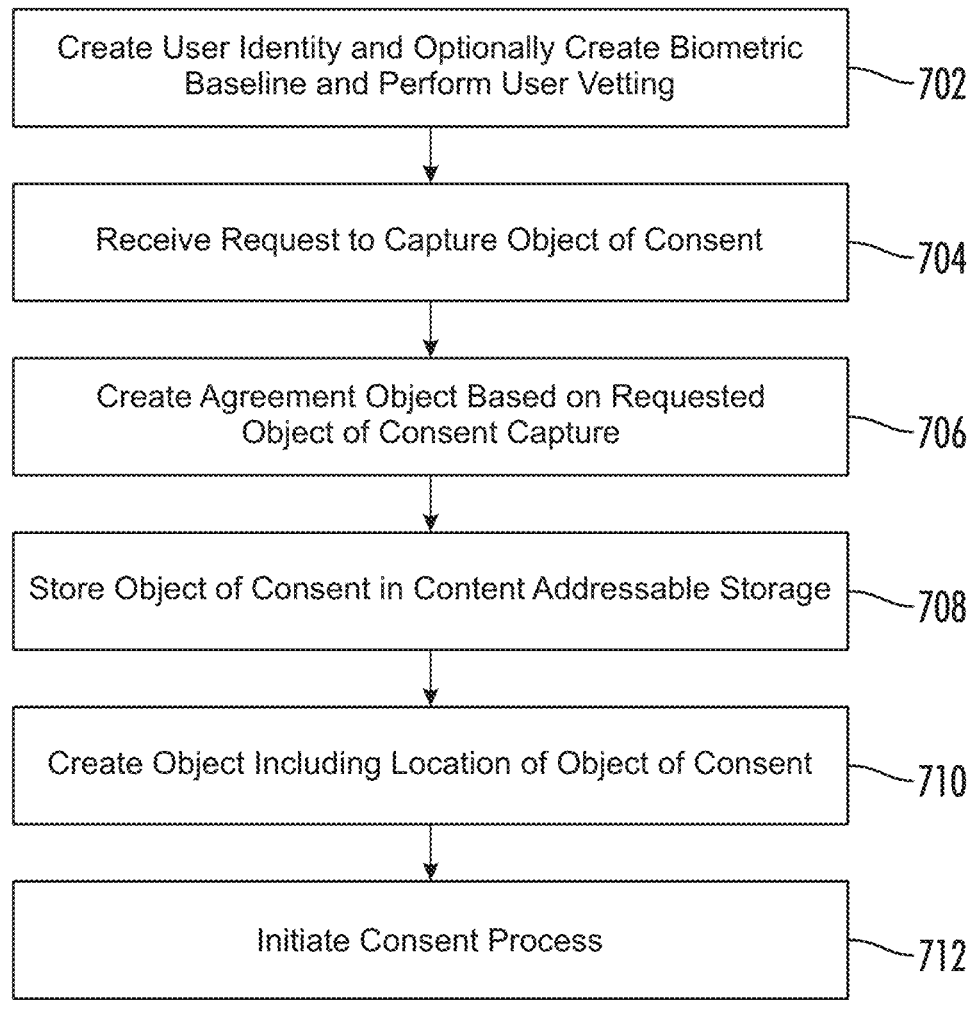
FIG. 7 illustrates an exemplary embodiment of an initial process according to aspects of the present disclosure.

FIG. 7 illustrates an exemplary embodiment of an initiation process according to aspects of the present disclosure. The initiation process 700 permits a first user 110 to create an object of consent to initiate a proposed transaction with a second user 150. This proposed transaction may be an offer regarding an object of consent, requesting consent by a second user to the offer provided by the first user regarding the object of consent. An object of consent may be a data object in various embodiments. The initiation process may enable a first user 110 to create an object of consent using the application 120 to be provided a second user 150. At least one requested consent action may be predetermined or dynamically determined, for example by the server 500, based at least in part upon the object of consent and/or at least one parameter associated with at least one of the first user 110 or second user 150.

The initiation process 700 begins at an operation 702 where a user identity is created. A first user 110 may create a user account for use with the system disclosed herein in association with an object of consent. As part of the process, the first user 110 may create a user identifier and provide at least one authentication parameter, such as a password, passphrase, biometric authentication, or any other mechanism capable of authorizing access or verifying identification of the first user 110. Upon first use of the system by a first user 110 or based at least in part upon an object of consent, the first user 110 may be queried to create and/or update an account by providing at least one of a user identifier and/or authentication parameter.

Either at a time of account creation or subsequent to account creation the first user 110 may be permitted or required to create a biometric baseline. The biometric baseline may include one or more sets of biometric information associated with the first user 110, for example received via at least one input device 220 of the user device 130. For example, a first user 110 may be requested by the application 120 to provide one or more of an image for use with a facial recognition test, a retina scan for use with a retina recognition test, a fingerprint scan for use with a fingerprint detection test, a voice recording for use with a voice recognition test, or any other set of biometric information that is capable of use to confirm an identity of the first user. The set of biometric information may be predetermined or dynamically determined based at least in part upon a type of content of the object of consent. Further vetting of the first user 110 may be implemented, for example in scenarios where a heightened proof is required or is expected for a consent process for the object of consent.

The process continues to an operation 704 where the application 120 provides the first user 110 with the ability to request the capture of an object of consent. As used herein, an object of consent may include an audio recording of the first user 110, a picture taken of the first user 110, a video captured of the first user 110, a set of text received from the first user 110, a virtual reality (VR) or augmented reality (AR) environment or element associated with the first user 110, or any other set of information associated with the first user 110 and captured by at least one input device 220 of the user device 130. The process continues to an operation 706 where an agreement object is selectively created based at least in part upon the requested object of consent capture. The agreement object may be created by triggering a template object associated with the object of consent. The triggered template object or portion thereof may be predetermined or dynamically determined based upon at least one of an identity of the first user 110, the identity of a second user 150, a type or content of the object consent, or combination thereof.

The agreement object corresponding to the triggered template object may be stored within a blockchain, for example using the data block 320 of at least one computing device 310. Prior to creating the agreement object, a user identifier of the first user 110 may be provided to a smart contract to determine whether the first user 110 is permitted to initiate a consent process associated with the object of consent (e.g., relating to permission information). The object of consent may then be stored as embedded evidence in a content-addressable storage system at an operation 708. The content-addressable storage system may be configured to encrypt at least one object using a hash function. The address may then be deterministically generated from the encrypted object's hash digest and allocated to the configured storage back-end. The address is specific to the particular content stored. This provides a mechanism to ensure that a piece of content is easily referenced and retrievable from storage based on limited information stored in the blockchain context. At an operation 710, a location of the object of consent within an agreement object may be logged (e.g., a data object including a location of the object of consent is created). The logged location may be associated with a blockchain via at least one smart contract address. The process then continues by performing initiation of a consent process at operation 712.

Figure 8:
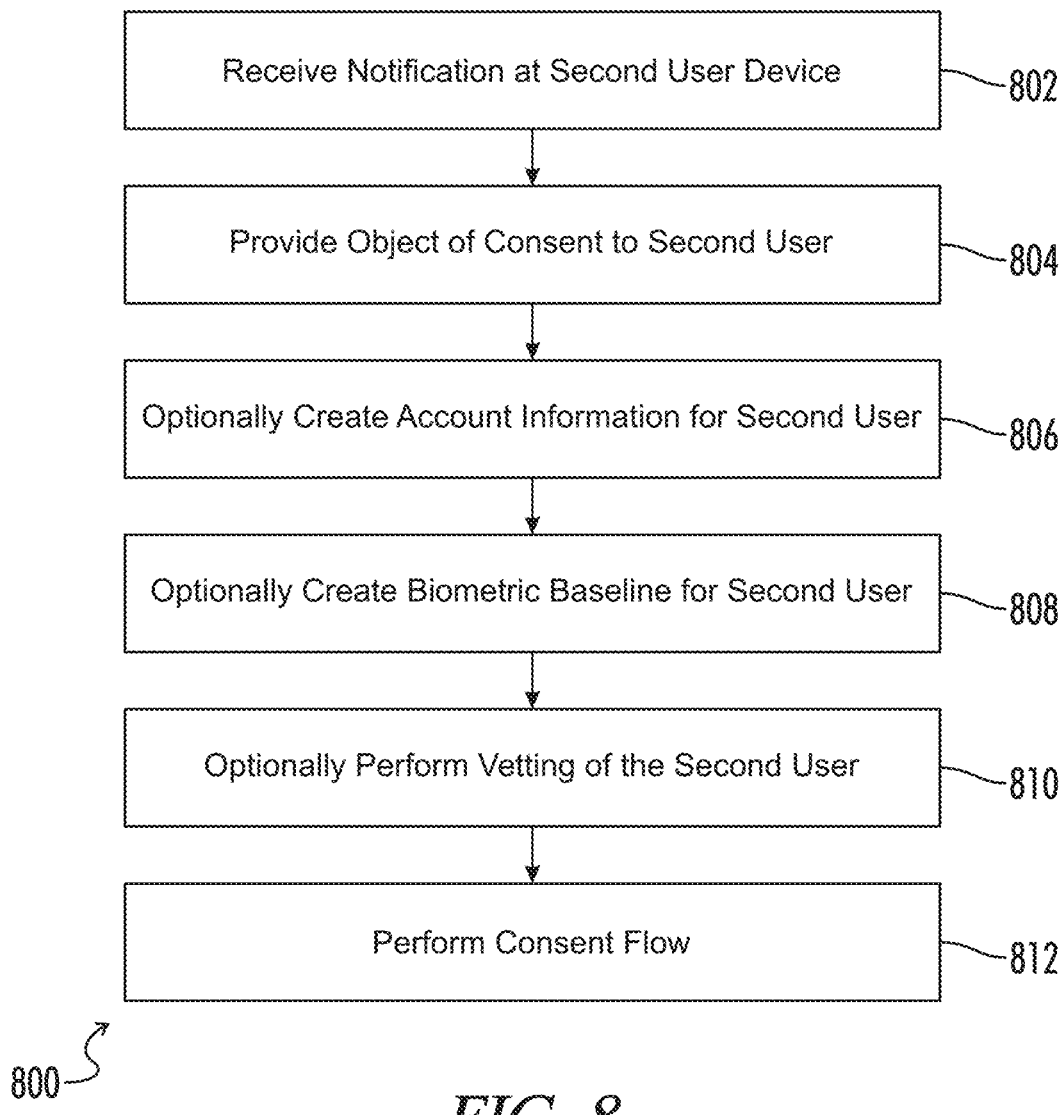
FIG. 8 illustrates an exemplary embodiment of a process for accepting an object of consent by a second user according to aspects of the present disclosure.

FIG. 8 illustrates an exemplary embodiment of a process for accepting an object of consent by a second user 150 according to aspects of the present disclosure. The process 800 of accepting an object of consent by a second user 150 begins at an operation 802 where the second user 150 is notified of a proposed object of consent from a first user 110. The notification of an object of consent may be received by the second user 150 via electronic communication from the server 500 in one embodiment. For example, the second user 150 may receive an e-mail message, a text message, a message associated with a virtual reality (VR) or augmented reality (AR) environment or element, or any other electronic communication notifying the second user 150 of the availability of a proposed object of consent from a first user 110. The second user 150 may additionally or alternatively be notified of the availability of the proposed object of consent from the first user 110 via at least one electronic message within the application 120 executed by the user device 130 associated with the second user 150. The notification provided to the second user 150 may include one or more actions requested of the second user 150 by the first user 110 associated with the object of consent. The notification provided to the second user 150 may be generated by the server 500 responsive at least in part based upon the new agreement object created responsive to the initiation process 700 by the first user 110.

After receiving the notification, at least a portion of the object of consent provided from the first user 110 may be reviewed at an operation 804 by the second user 150, for example via the application 120. The second user 150 may be prompted at an operation 806 to create or update their user account for use with the consent verification system in association with a proposed object of consent. As part of the process, the second user 150 may create a user identifier and provide at least one authentication parameter, such as a password, passphrase, biometric authentication, or any other mechanism capable of authorizing access or verifying identification of the second user 150. Upon first use of the system by the second user 150 or based at least in part upon an object of consent, the second user 150 may be queried to create and/or update an account by providing at least one of a user identifier and/or authentication parameter.

Either at a time of account creation or subsequent to account creation the second user 150 may be permitted or required to create a biometric baseline at an operation 808. The biometric baseline may include one or more sets of biometric information associated with the second user 150, for example received via at least one input device 220 of the user device 130. For example, a second user 150 may be requested by the application 120 to provide one or more of an image for use with a facial recognition test, a retina scan for use with a retina recognition test, a fingerprint scan for use with a fingerprint detection test, a voice recording for use with a voice recognition test, a virtual reality (VR) environment or element, an augmented reality (AR) environment or element, or any other set of biometric information that is capable of use to confirm an identity of the second user 150. The set of biometric information may be predetermined or dynamically determined based at least in part upon a type of content of the object of consent. Further vetting of the second user 150 may be optionally implemented at an operation 810, for example in scenarios where a heightened proof is required or is expected for a consent process for the object of consent. A consent process may then begin at an operation 812.

In accordance with a consent process for an object of consent, one or more signature objects might be required from at least one of the first user 110 and/or second user 150. The server 500 may be configured to dynamically determine one or more biometric, photographic, or other form of consent verification(s) required by at least one of the first user 110 and/or second user 150 based at least in part upon a parameter of the object of consent in association with a smart contract. That is to say that oftentimes consent to an agreement requested by the first user 110 might often require consent at one or more operations from each of the first user 110 and the second user 150.

Figure 9:
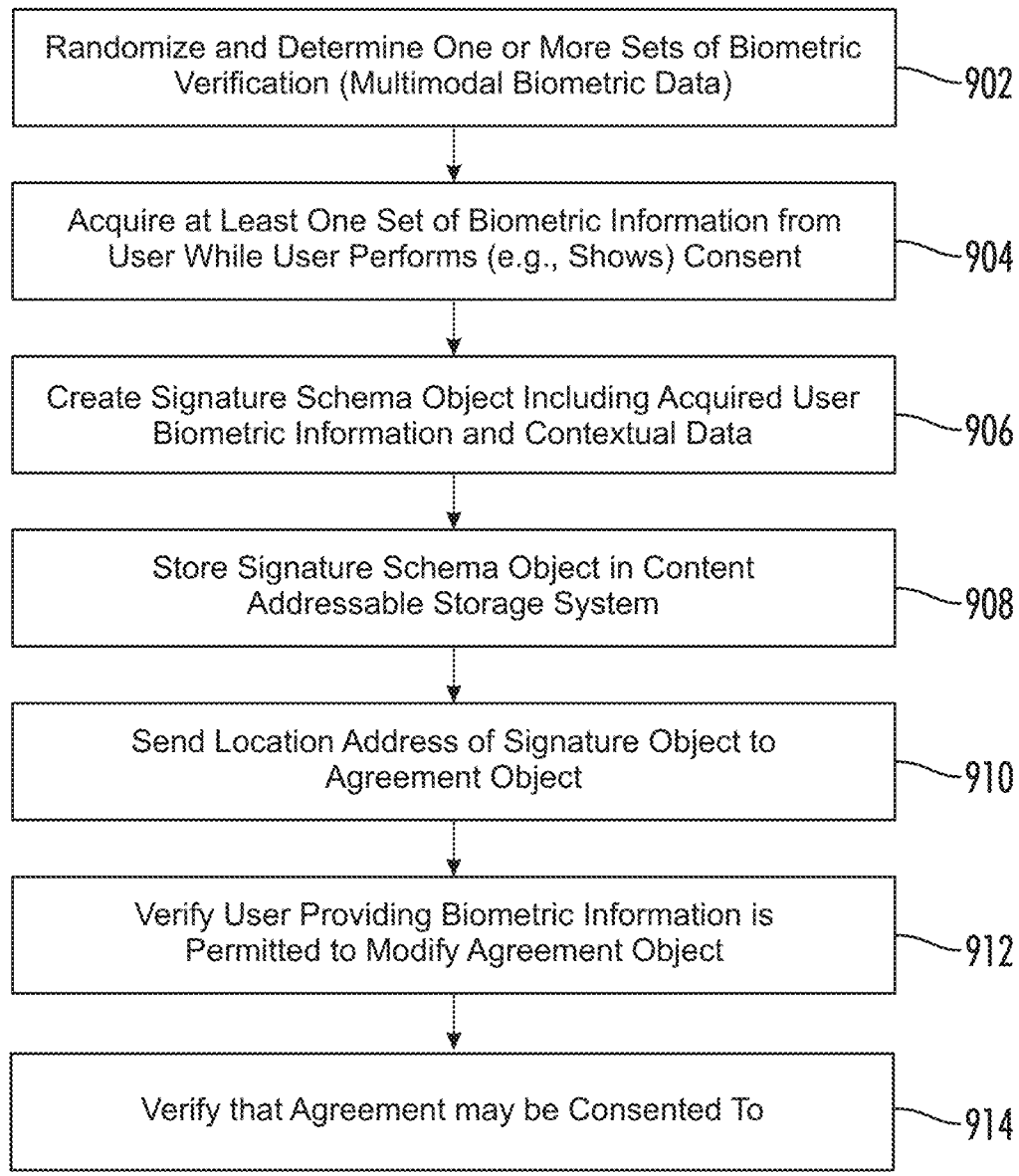
FIG. 9 illustrates an exemplary embodiment of a consent process according to aspects of the present disclosure.

FIG. 9 illustrates an exemplary embodiment of a consent process 900 according to aspects of the present disclosure. The consent process 900 begins at an operation 902 where one or more sets of consent verification (e.g., biometric verification, photographic, or other consent verification) required for a user is randomized and determined. The operation of determining one or more sets of consent verification (such as biometric verification) for a particular user may be performed by the user device 130 associated with such particular user. The determined one or more sets of biometric verification may be selected from a biometric baseline, for example including one or more of a facial recognition test, a retina scan for use with a retina recognition test, a fingerprint scan for use with a fingerprint detection test, a voice recording for use with a voice recognition test, a VR or AR environment or element, or any other set of biometric or other information. At least one set of required biometric verification may be predetermined or dynamically determined, in whole or in part, by the server 500. Although described with reference to biometric verification, it should be appreciated that any form of consent verification may be used without departing from the spirit and scope of the present disclosure, optionally including one or more of an image, a video, an audio recording, an AR or VR element, or any other set of information or data relating to at least one of a user 110, 150 and/or user device 130.

At an operation 904 at least one set of biometric information may be acquired while the user "shows" their consent in an act of consent, for example as captured by at least one input device 220. Examples of showing consent may include audio recording, image capture, video recording, or any other real-time or near real-time capture of a user's consent intent. The acquired at least one set of biometric information may be associated with contextual data. Contextual data may include, for example, a location of the user device 130 (e.g., using the device positioning component 240), a hardware device identifier (e.g., unique device identifier) of the user device 130 being used by the user (such as an International Mobile Equipment Identity (IMEI) number), one or more user account parameter associated with a user device 130 (such as subscriber identity module (SIM) data), or other contextual data. A signature schema object is created at an operation 906 incorporating the acquired user biometric information and contextual data. The created signature schema object is stored in a content-addressable storage system at an operation 908. A location address of the signature object is then sent to the agreement object at an operation 910. One or more smart contracts may then be used to verify that a user providing the biometric information is permitted to modify the agreement object within the blockchain at an operation 912 (e.g., using permission information). If the user is permitted to modify the agreement object, one or more smart contract(s) may then be used to verify whether the agreement object may be consented to at an operation 914. If the result at either operation 912 or 914 is that the user does not have the permission to modify the agreement object or that the agreement object may not be consented to, the process ends. If, however, the user may modify the agreement object and the agreement object may be consented to, the process continues to an operation 916 where the signature object for the user is attached to the agreement object.

Figure 10:
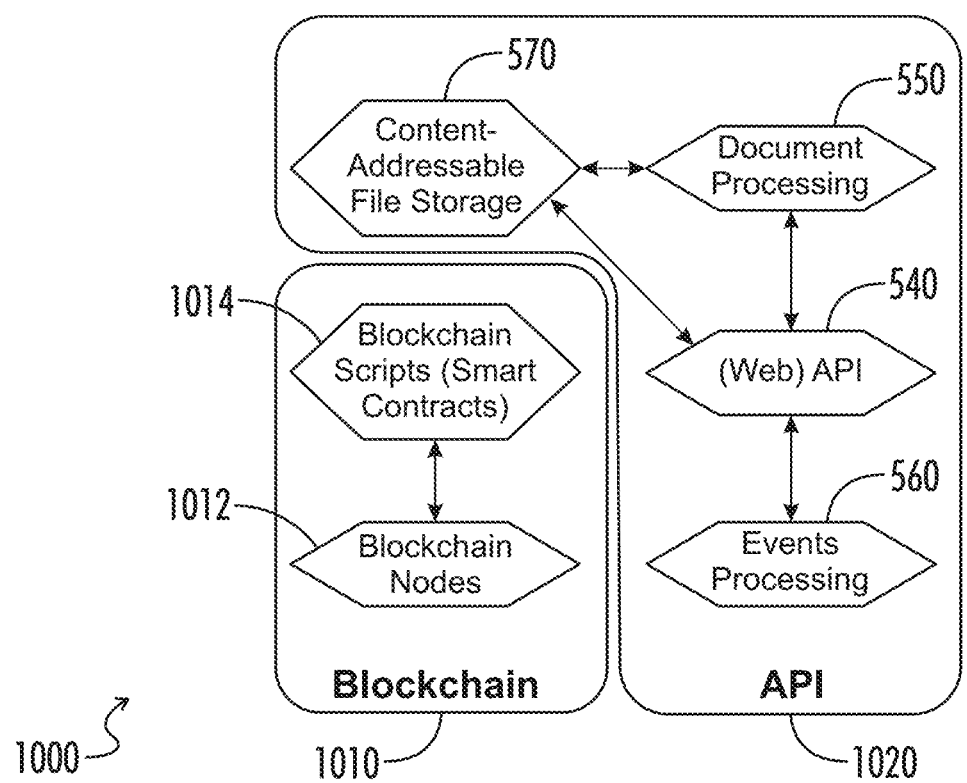
FIG. 10 illustrates an exemplary embodiment of a partial functional block diagram of system reflecting the interrelationship between a blockchain and Application Programming Interface (API) according to aspects of the present disclosure.

FIG. 10 illustrates an exemplary embodiment of a partial functional block diagram of system reflecting the interrelationship between a blockchain and Application Programming Interface (API) according to aspects of the present disclosure. The system 1000 includes a blockchain 1010 and an API 1020. The blockchain 1010 may be implemented, for example, by the one or more computing devices 310 in the manner previously disclosed herein. The API 1020 may be implemented, in whole or in part, by one or more servers 500 as previously described herein. The blockchain 1010 includes one or more blockchain nodes 1012. The one or more blockchain nodes 1012 may include at least one of the computing devices 310 previously described herein. One or more blockchain node 1012 may be communicatively coupleable to one or more blockchain scripts 1014 (e.g., smart contract(s)). The one or more blockchain nodes 1012 may be configured to implement one or more blockchain scripts 1014 in various embodiments. The one or more blockchain scripts 1014 may be stored by (in whole or in part) or otherwise accessible by at least one of the blockchain nodes 1012 and may be used to perform at least one operation associated with the blockchain 1010.

The blockchain 1010 may be communicatively coupleable to the API 1020, for example via the network 140 previously described herein. The API 1020 may include an interface module 1022, a document processing module 1024, an events processing module 1026, and/or a content-addressable file storage 1028. At least a portion of one or more of the interface module 1022, the document processing module 1024, the events processing module 1026, or the content-addressable file storage 1028 may be stored or implemented at one or more server 500. Additionally or alternatively, at least a portion of one or more of the interface module 1022, the document processing module 1024, the events processing module 1026, or the content-addressable file storage 1028 may be implemented or stored remotely from the server 500 but may be communicatively coupleable with or obtainable by the server 500 in various embodiments.

One or more blockchain nodes 1012 may be communicatively coupleable to the events processing module 1026, for example via the network 140. The interface module 1022 of the API 1020 may be communicatively coupleable with the blockchain scripts 1014 via the network 140. The interface module 1022 may be communicatively coupleable to both the document processing module 1024 and the content-addressable file storage 1028 of the API 1020.

Figure 11:
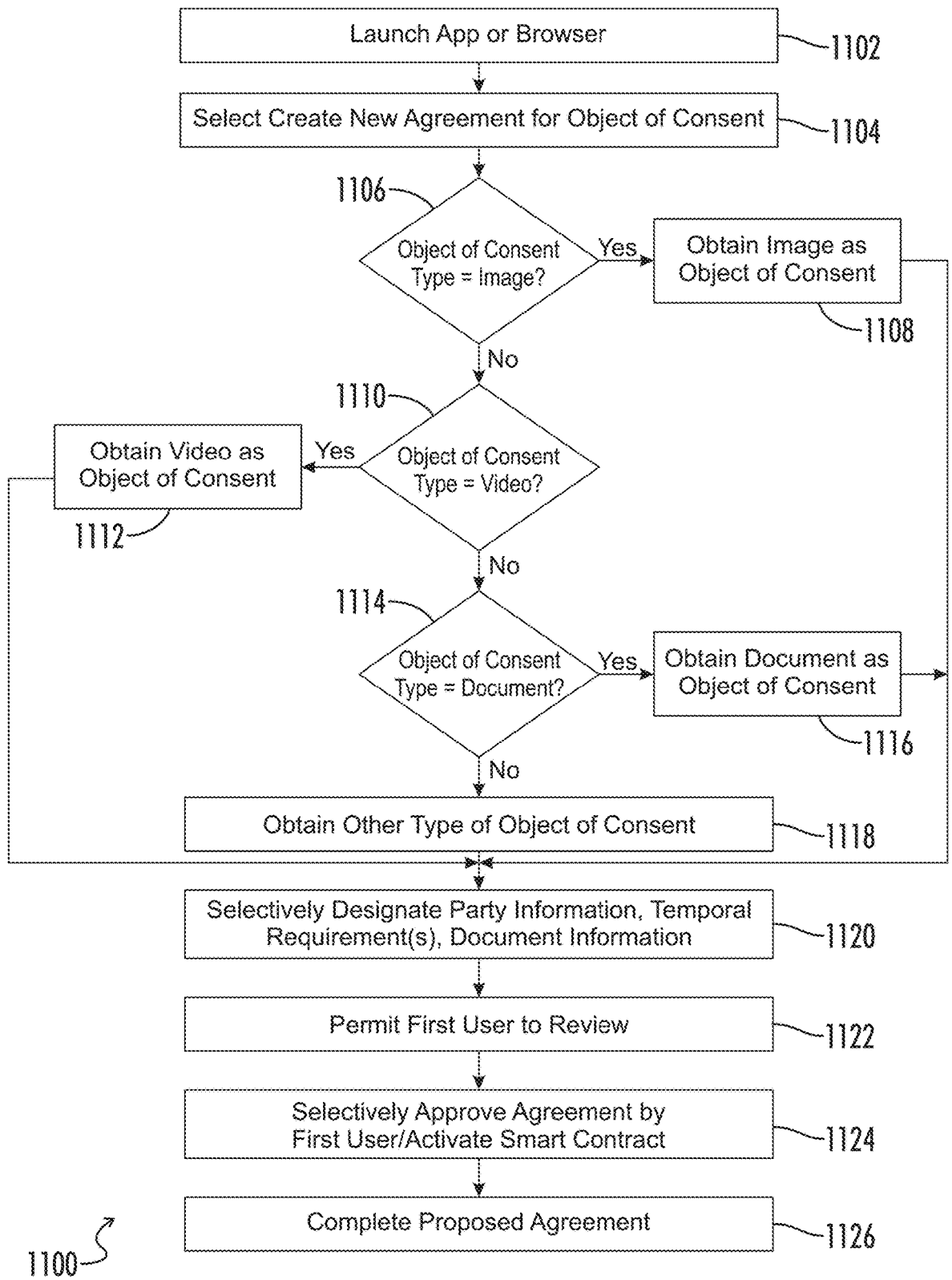
FIG. 11 illustrates an exemplary embodiment of a method for creating a proposed agreement according to aspects of the present disclosure.

FIG. 11 illustrates an exemplary embodiment of a method for creating a proposed agreement according to aspects of the present disclosure. The method 1100 begins at an operation 1102 where a first user 110 accesses a user device 130 and executes at least one of the client app 212 or the browser 214 executing upon the user device 130. The process continues to an operation 1104 where the first user 110 selectively requests to create a new agreement relating to an object of consent. The first user 110 is provided the option to either select an existing object of consent or to select a type of object of consent to be created and/or obtained via the client app 212 or the browser 214. For example, the first user 110 of the user device 130 may be prompted to select a type from a group including, in whole or in part, one or more of a picture, a video, a document, an AR or VR element, or any other capturable, obtainable, or receivable forms of media or data.

It is determined at an operation 1106 whether the object of consent type is an image. If it is determined at operation 1106 that the type is a photo, the process continues to an operation 1108 where the first user 110 is capable of obtaining a photograph or other visual representation, for example using one or more input device(s) of the user device 130. For example, the first user 110 may obtain an image using the camera 224 of the user device 130. The process may then continue to an operation 1120. If it is determined at operation 1106 that the type is not an image, the process continues to an operation 1110 where it is determined whether the object of consent type is a video. If it is determined that the type is a video, the process continues to an operation 1112 where the first user 110 is capable of obtaining a video recording or similar visual representation, either with or without audio component. The obtained video recording or similar visual representation may be obtained using the camera 224 of the user device 130. The process may then continue to an operation 1120. If it is determined at operation 1110 that the type is not a video, the process may continue to an operation 1114 where it is determined whether an electronic document or portion thereof is the type of object of consent. If it is determined at operation 1114 that the type is an electronic document or portion thereof, the process continues to an operation 1116 where the first user 110 is capable of selecting a stored electronic document (or portion thereof) or providing a location of an electronic document (or portion thereof), for example using one or more input device(s) 220 of the user device 130 and/or accessing the electronic document or portion thereof via the communication module 230 and network 140. For example, the first user 110 may select an electronic document stored at the storage 216 of the user device 130 and/or may select an electronic document capable of being obtained via the communication module 230. The process may then continue to operation 1120. If it is determined at operation 1116 that the type of object of consent is not a document, the process may continue to an operation 1118, where a first user 110 of the user device 130 may obtain an object of consent having a type that is not an image, video, or document (e.g., via one or more input device(s) 220 and/or communication module 230). Although operations 1106, 1110, 1114, and 1118 are illustrated in a particular sequence in FIG. 11 it should be appreciated that these operations may be performed in any order or one or more operations may be performed simultaneously without departing from the spirit and scope of the present disclosure.

Once an object of consent has been obtained, the process continues to an operation 1120 where the first user 110 is provided with the ability to designate one or more parties to the agreement. The first user 110 may be permitted to provide one or more of party identification and/or contact information, one or more temporal setting associated with the object of consent (such as an expiration time), one or more sets of document information relating to the object of consent, one or more sets of permission information, or any other set of information and/or metadata. Party information provided by the first user 110 may include at least one of identifying information or address information relating to two or more parties in an exemplary embodiment. After the information is designated by the first user 110 the process continues to an operation 1122 where the first user 110 is provided an ability to review the object of consent. The first user 110 is then permitted to selectively approve the proposed agreement at an operation 1124. After approval by the first user 110, one or more predetermined or dynamically determined smart contracts may be activated associated with the proposed agreement (e.g., based at least in part upon a pre-granted approval by the first user 110 of the object consent as obtained from the first user 110), at least a portion of the proposed agreement or identifier or address thereof may be associated with the blockchain. For example, a "Create Agreement" transaction 422a may be stored at a transaction list 420 of a data block 320 of the blockchain as illustrated by FIG. 4 (e.g., a consent record may be stored at the transaction list 420 of the data block 320 of the blockchain). The proposed agreement is the considered completed at an operation 1126, and a notification of the proposed agreement may be selectively provided to at least one party.

Figure 12:
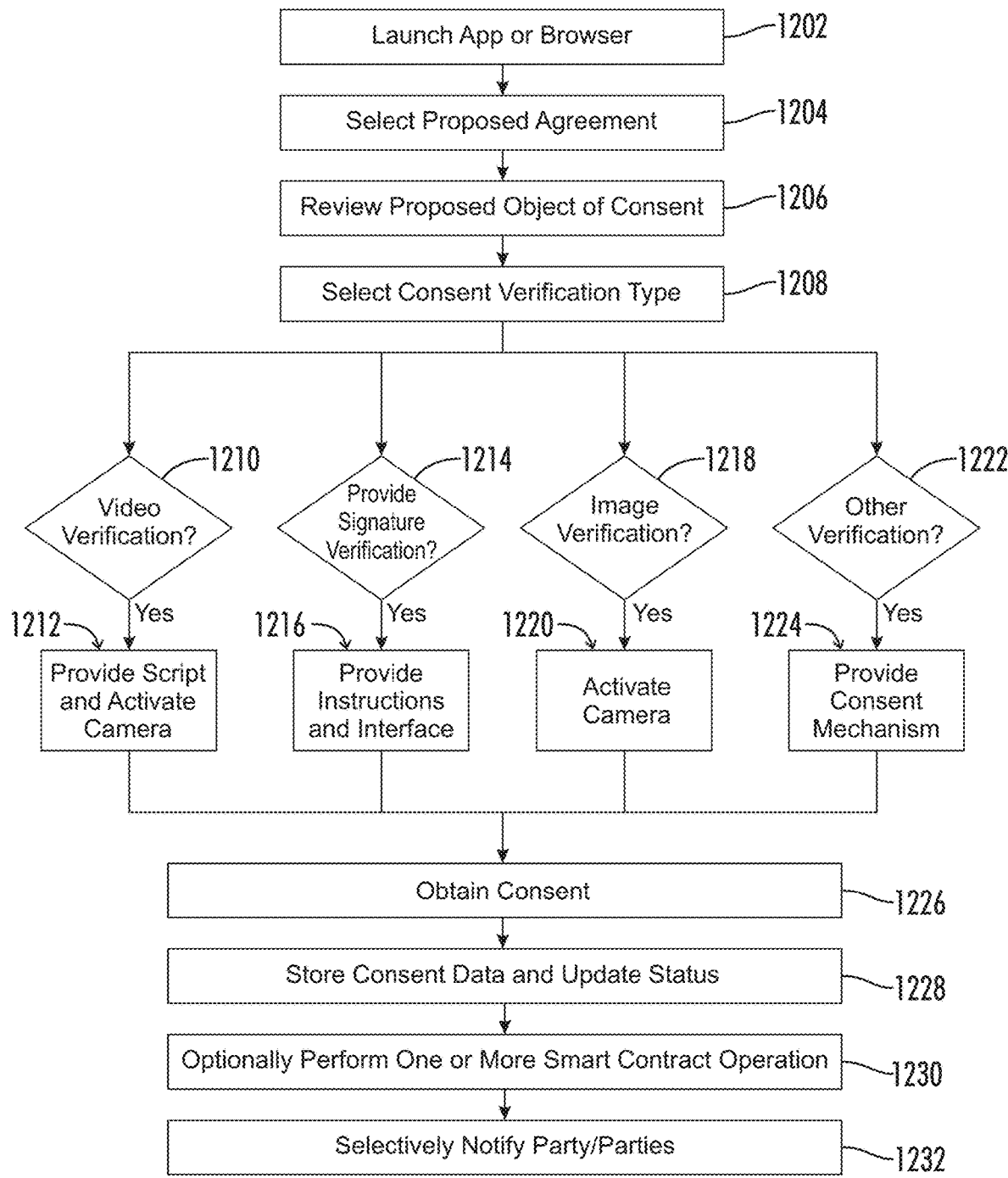
FIG. 12 illustrates an exemplary embodiment of a method for consenting to a proposed object of consent according to aspects of the present disclosure.

FIG. 12 illustrates an exemplary embodiment of a method for consenting to a proposed object of consent according to aspects of the present disclosure. The process 1200 begins at an operation 1202 where a second user 150 accesses a user device 130 and executes at least one of the client app 212 or the browser 214 executing upon the user device 130. The process continues to an operation 1204 where the second user 150 is provided an interface configured to visually convey one or more proposed objects of consent. The one or more proposed objects of consent may be received from one or more parties and may be one-off agreements relating to disparate objects of consent in one exemplary embodiment. Additionally or alternatively, in various embodiments two or more proposed objects of consent may be related to one another and may be selectively linked to one another.

After the second user 150 selects a proposed object of consent at operation 1204, the process continues to an operation 1206 where the second user 150 is provided with the ability to review the proposed object of consent. As discussed herein, the proposed object of consent may be an image, a video, a document or portion thereof, an AR or VR element, or any other set of data or information conveyable to the second user 150 for review and selective approval. If the second user 150 consents to the proposed object of consent, the process continues to an operation 1208 where the second user 150 is provided with an interface for selecting a consent verification type. Similar to the object of consent, the consent verification type may include one or more of an image, a video, an audio recording, an AR or VR element, a digital signature, or any other set of data or information obtainable from or in association with the second user 150 to provide consent to the proposed object of consent. Although described with reference to the second user 150 selecting the consent verification type, it should be appreciated that in various embodiments the consent verification type may vary according to a type or specific one of or variant of object of consent. The consent verification type may additionally or alternatively vary based at least in part upon a selection or criteria of first user 110 having created the proposed object of consent and/or according to a type, format, content of, or other parameter associated with a proposed object of consent.

After the second user 150 selects the consent verification type at operation 1208, the process continues to one or more of operations 1210, 1214, 1218, or 1222, where a selected consent verification type is obtained from the second user 150. At an operation 1210 it is determined whether the consent verification type is a video. If it is determined at operation 1210 that the consent verification type is video, the process continues to an operation 1212, where the second user 150 is optionally provided with a script to recite as part of a video and the user device 130 activates a consent verification device or component for obtaining a consent verification video, for example the camera 224 of the user device 130. The process then continues to an operation 1226 where consent is obtained. At an operation 1214 it is determined whether the consent verification type is a signature. If it is determined at operation 1214 that the consent verification type is signature, the process continues to an operation 1216 where signature options are optionally provided to a user and an interface for receiving a signature is provided to the second user 150. The interface for receiving the signature may include, for example, a signature pad within the client app 212 or browser 214 for a user to provide a signature using his or her finger, an input interface for receiving a physical representation of a signature from the second user 150, or any other physical or programmable interface for obtaining a signature or representation thereof from the second user 150. Additionally or alternatively, the second user 150 may select a stored signature file to be associated with the proposed object of consent as verification. The process then continues to operation 1226.

At an operation 1210 it is determined whether the consent verification type is an image. If it is determined at operation 1218 that the consent verification type is an image, the process continues to an operation 1220, where a consent verification device or component is activated for obtaining a consent verification image, for example the camera 224. The process then continues to an operation 1226 where consent is obtained. At an operation 1222 it is determined whether an alternative consent verification type was selected by the second user 150. If it is determined at operation 1222 that an alternative consent verification type was selected by the second user 150, the process continues to an operation 1224 where a mechanism and/or interface for providing consent is presented to or otherwise useable by the second user 150 to provide consent. The process then continues to operation 1226 where consent verification is received from the second user 150.

After obtaining consent verification at operation 1226, the process continues to an operation 1228 where consent verification data received from the second user 150 is stored and a status regarding the proposed object of consent is updated. In various embodiments, the consent verification data may be stored and an associated hash value thereof may be stored as transaction data in the blockchain (e.g., as transaction 422c of the transaction list 420 of data block N+2 of FIG. 4). The process then continues to an operation 1230 where at least one operation or transaction associated with a smart contract related to the proposed object of consent is performed. For example, a smart contract may be configured to automatically complete an agreement regarding a proposed object of consent when the second user 150 provides consent verification based at least in part upon the previously received consent from the first user 110 received while creating the proposed object of consent. That is to say that an agreement may be finalized in accordance with the present disclosure when the second user 150 provides consent verification in relation to the proposed object of consent, without any further action by either the first user 110 or the second user 150. The process then continues to an operation 1232 where one or more parties are selectively notified of the status and/or completion of the agreement.

In various apparatuses, systems, and methods in accordance with the present disclosure, a first user 110 and/or second user 150 may be provided with the ability to view one or more completed agreements (for example, as ordered according to parties, type or content of object of consent, or any other way of visually conveying one or more agreements to at least one of the first user 110 and/or second user 150). The completed agreement information provided to the first user 110 and/or second user 150 may include one or more of the object of consent, consent verification obtained by one or more of the first user 110 or second user 150, temporal data reflecting one or more aspect of the agreement, a party list, or any other set of information associated with the completed agreement, parties thereto, and/or object of consent (or any subset or metadata related thereto).

Similarly, in various apparatuses, systems, and methods in accordance with the present disclosure, a first user 110 and/or second user 150 may be provided with the ability to view one or more pending (e.g., proposed or previously created) agreements. The one or more pending agreements may be ordered, for example, as according to parties, type or content of object of consent, or any other way of visually conveying one or more agreements to at least one of the first user 110 and/or second user 150). The pending agreement information provided to the first user 110 and/or second user 150 may include one or more of the object of consent, consent verification obtained by one or more of the first user 110 or second user 150, temporal data reflecting one or more aspect of the agreement, a party list, or any other set of information associated with the completed agreement, parties thereto, and/or object of consent (or any subset or metadata related thereto).

Figure 13:
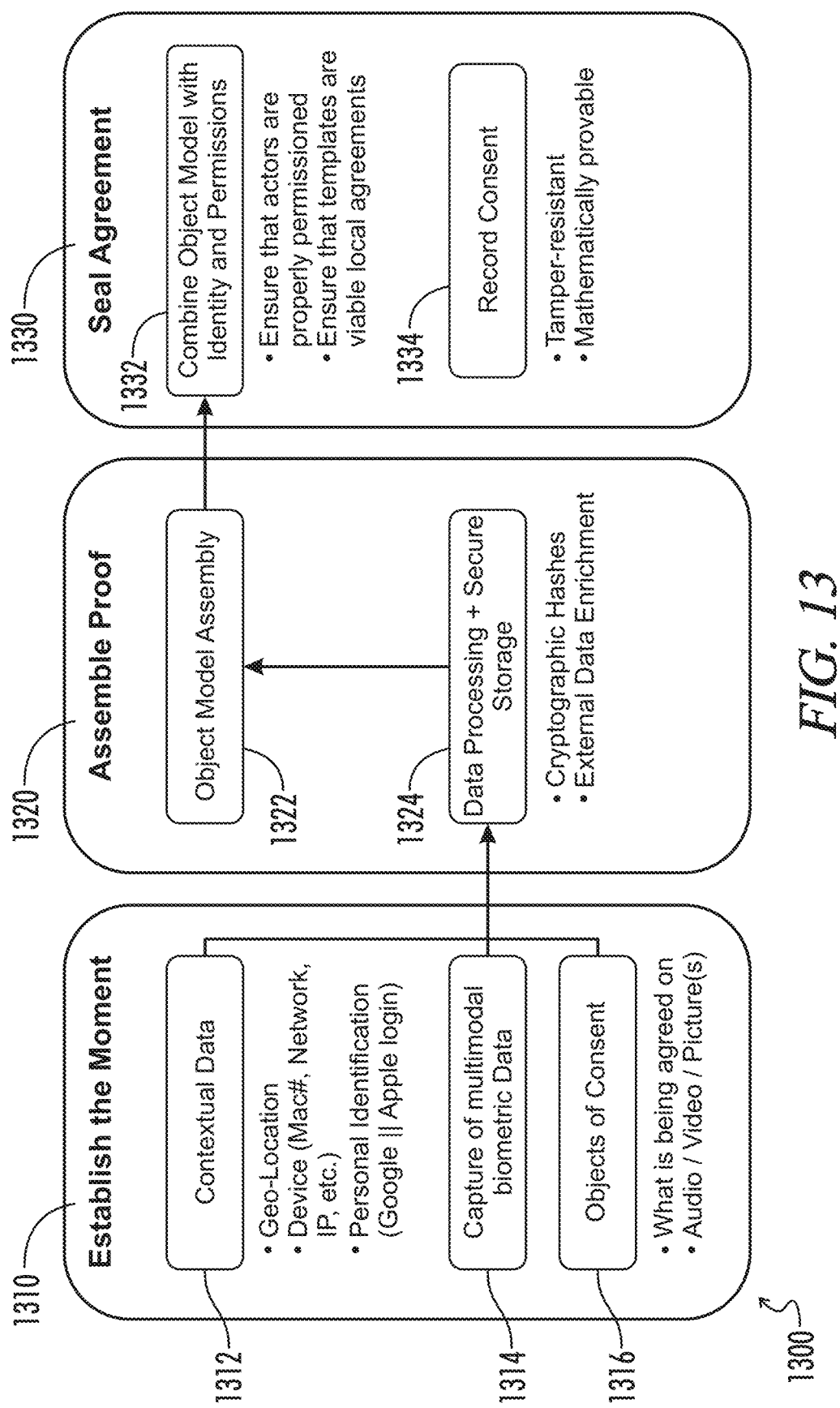
FIG. 13 illustrates an exemplary embodiment of a partial flow diagram according to aspects of the present disclosure.

FIG. 13 illustrates an exemplary embodiment of a partial flow diagram according to aspects of the present disclosure. The flow 1300 includes an establishment block 1310, an assemble proof block 1320, and a seal agreement block 1330. The establishment block 1310 includes one or more of a contextual data operation 1312, a capture multimodal biometric data operation 1314, and/or an object of consent operation 1316. The contextual data operation 1312 may include one or more operations performed by or in conjunction with the device positioning component 240 of a user device 130 in various embodiments. The contextual data operation 1312 may include or otherwise relate to one or more of geo-location information device information (optionally including or associated with a media access control (MAC) address, a network address such as an Internet Protocol (IP) address, or any other device-identifying information), and/or personal identification information, such as a Google or Apple login username, password, or combination thereof. The establishment block 1310 may further include a capture of multimodal biometric data operation as described herein in relation to FIG. 2. The establishment block 1310 may further include an object of consent operation 1316 which may relate to obtaining an element to be proposed and/or considered for agreement. As previously described herein, an object of consent and/or consent verification may include, in whole or in part, one or more of a picture, a video, a document, an AR or VR element, or any other capturable, obtainable, or receivable forms of media or data. One or more of the operations described with reference to the establishment block may be performed at, by, or in conjunction with a user device (e.g., a user device 130 as described herein), although one or more of the operations may additionally or alternatively be implemented, in whole or in part, by another device or element without departing from the spirit and scope of the present disclosure.

The assemble proof block 1320 may include at least one of an object model assembly operation 1322 and/or data processing and secure storage operation 1324. The data processing and secure storage operation 1324 may receive at least one set of information from one or more of the contextual data operation 1312, the capture of multimodal biometric data operation 1314, and/or the object of consent operation 1316. The data processing and secure storage operation 1324 may be configured to implement, either alone or in combination, one or more operations relating to cryptographic hash generation, verification, and/or addressing, and external data enrichment in manners previously described herein. An output of the data processing and secure storage operation 1324 may be provided to the object model assembly operation 1322 to generate an object model in the manner previously described herein. One or more of the object model assembly operation 1322 may be performed using an API, for example provided by the server 500 previously described herein, although other elements and/or operations may be used without departing from the spirit and scope of the present disclosure.

The seal agreement block 1330 may include at least one of a combine object model with identity and permissions block 1332 and/or a record consent block 1332. The combine object model with identity and permissions block 1332 may receive input from the object model assembly block 1322 of the assembly proof block 1320. For example, an assembled object model may be received at the combine object model with identity and permissions block 1332 in various embodiments. The combine object model with identity and permissions block 1332 may perform one or more operations, for example relating to ensuring that one or more actors/parties are properly permissioned or authorized, and/or ensuring that one or more templates or portions thereof are viable legal agreements. The record consent operation 1334 may include one or more operations of recording consent to an agreement, providing tamper resistance to one or more aspects of the consent and/or consent record, and/or provide mathematic provability in relating to one or more operations or elements. One or more of the combine object model with identity and permissions block 1332 or record consent operation 1334 may be performed at a blockchain, such as the blockchain previously described herein (although one or more aspects of operations may be implemented, in whole or in part, by one or other elements without departing from the spirit and scope of the present disclosure.

To facilitate the understanding of the embodiments described herein, a number of terms are defined below. The terms defined herein have meanings as commonly understood by a person of ordinary skill in the areas relevant to the present disclosure. Terms such as "a," "an," and "the" are not intended to refer to only a singular entity, but rather include the general class of which a specific example may be used for illustration. The terminology herein is used to describe specific embodiments of the disclosure, but their usage does not delimit the disclosure, except as set forth in the claims. The phrase "in one embodiment," as used herein does not necessarily refer to the same embodiment, although it may. As used herein, the term "agreement" may include one or more of an image, a video, an audio element, an AR or VR element, or any other capturable, obtainable, or receivable form(s) of media or data.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this disclosure except as set forth in the following claims

What is claimed is:

1. A method of modifying state based upon a proposed object of consent, comprising:
    encrypting at least a location of the proposed object of consent within a blockchain using a hash function;
    deterministically generating an address for the location of the object of consent from the hash function;
    receiving transaction data by a template object, wherein the transaction data comprises the address and respective identities of at least a first user and a second user as parties to, or referenced in, an agreement associated with the object of consent, and further authorized to initiate a consent process;
    creating a unique agreement object based at least in part upon the received transaction data, wherein the unique agreement object has a first state;
    loading an agreement object process model into a process engine within a blockchain, wherein the process engine controls subsequent changes in state and further stores data and data locations within the blockchain;
    adjusting a state of the unique agreement object from the first state to a second state, wherein one or more signing tasks associated with the unique agreement object are determined;
    notifying at least the second user of availability of the proposed object of consent, and of one or more associated signing tasks;
    requiring at least the second user to provide one or more authentication parameters dependent on a type of content of the object of consent;
    determining whether at least one signature object is associated with each of the one or more signing tasks associated with the unique agreement object;
    registering with the blockchain the at least one signature object, wherein the signature object is associated with an act of consent as to the object of consent by a signing user;
    associating the signature object with the unique agreement object by sending the location of the signature object to the agreement object; and
    transitioning the agreement object from the second state to a third state when it is determined that all required signature objects for the unique agreement object have been satisfied.

2. The method of claim 1, wherein at least one operation other than the signing task is selectively performed prior to the transitioning the unique agreement object to the third state.

3. The method of claim 1, further comprising triggering an execution process associated with the unique agreement object after transitioning the unique agreement object to the third state.

4. The method of claim 3, wherein the triggering the execution process includes storing a representation of the unique agreement object at the third state within the blockchain.

5. The method of claim 1, wherein at least one of the one or more authentication parameters required of the at least second user comprises respective biometric information received via an input device.

6. The method of claim 5, wherein the biometric information is further associated with contextual data when the biometric information is received from the at least second user, and each signature object is created incorporating the received biometric information and contextual data.

7. The method of claim 6, wherein the contextual data comprises a location of the respective input device.

* * * * *